United States Patent [19]

Kraus et al.

[11] Patent Number: 4,800,853
[45] Date of Patent: Jan. 31, 1989

[54] ADIABATIC INTERNAL COMBUSTION ENGINE

[75] Inventors: Charles E. Kraus; Charles B. Lohr, both of Austin, Tex.

[73] Assignee: Excelermatic Inc., Austin, Tex.

[21] Appl. No.: 142,477

[22] Filed: Jan. 11, 1988

[51] Int. Cl.⁴ .............................................. F02F 1/00
[52] U.S. Cl. ................................. 123/193 CP; 123/668
[58] Field of Search ............ 123/193 CP, 193 C, 668, 123/669, 193 CH, 193 P

[56] References Cited

U.S. PATENT DOCUMENTS

| | | | |
|---|---|---|---|
| 1,820,878 | 8/1931 | Wyckoff | 123/668 |
| 3,408,995 | 11/1968 | Johnson | 123/668 |
| 4,524,498 | 6/1985 | Hartsock | 123/193 P |
| 4,763,619 | 8/1988 | Eitel | 123/193 C |

FOREIGN PATENT DOCUMENTS

| | | | |
|---|---|---|---|
| 102539 | 6/1982 | Japan | 123/193 C |
| 18152 | of 1893 | United Kingdom | 123/668 |

Primary Examiner—E. Rollins Cross

[57] ABSTRACT

In an adiabatic internal combustion engine with a piston movably disposed in a cylinder to which air and fuel are admitted for combustion therein and from which the gases generated during combustion are discharged after extraction of energy therefrom, the cylinder includes a piston guide and seal structure having piston seal rings associated therewith and has a wall structure of heat resistant material and the piston has a guided section adapted to move back and forth through the guide and seal structure and a cap of heat resistant material disposed on top of the guided piston section and having a cylindrical side wall slightly spaced from the heat resistant cylinder wall.

6 Claims, 3 Drawing Sheets

ADIABATIC INTERNAL COMBUSTION ENGINE

BACKGROUND OF THE INVENTION

The invention relates to an adiabatic internal combustion engine including a piston movable in a cylinder to extract energy from fuel combusted in the cylinder.

Piston engines as used in automobiles or generally as power sources usually have water or air-cooled cylinders in order to keep the cylinder walls cool enough to permit oil lubrication of the piston movably disposed therein. New materials such as ceramics and high temperature oils have stimulated developments of uncooled engines but, because of the high surface temperature, lubrication of the piston and cylinder walls are still posing formidable problems.

It is therefore the principal object of the present invention to provide an adiabatic internal combustion engine which overcomes those problems.

SUMMARY OF THE INVENTION

This is achieved by an adiabatic internal combustion engine with a piston disposed in a cylinder to which air and fuel are admitted and from which the combustion gases are discharged after extracting energy therefrom wherein the cylinder includes a piston guide and seal structure having stationary piston seal rings associated therewith and has a wall structure of heat resistant material and the piston has a guided lower section adapted to move back and forth through the guide and seal structure and a cap of heat resistant material disposed above the guided piston section and having a cylindrical surface slightly spaced from the heat resistant cylinder wall.

With this arrangement the heat resistant material surfaces of the piston and the cylinder are not in contact with one another and therefore need not be lubricated. Their temperature may therefore be permitted to be very high without causing any damage to the engine's lubricant. The guide and seal structure of the cylinder wall which contains the seal rings and which is lubricated is sufficiently remote from the center of the combustion chamber as not to be unduly exposed to the high combustion gas temperatures especially since, by the time the piston reaches its lower end of travel, the combustion gases are sufficiently cooled by expansion and extraction of energy.

It is noted that the engine may be a normal gas engine or a Diesel engine, it may be a four-cycle or a two-cycle engine—the concept according to the invention can be employed with any type of piston engine.

SHORT DESCRIPTION OF THE DRAWINGS

DESCRIPTION OF A PREFERRED EMBODIMENT

Figure 1:
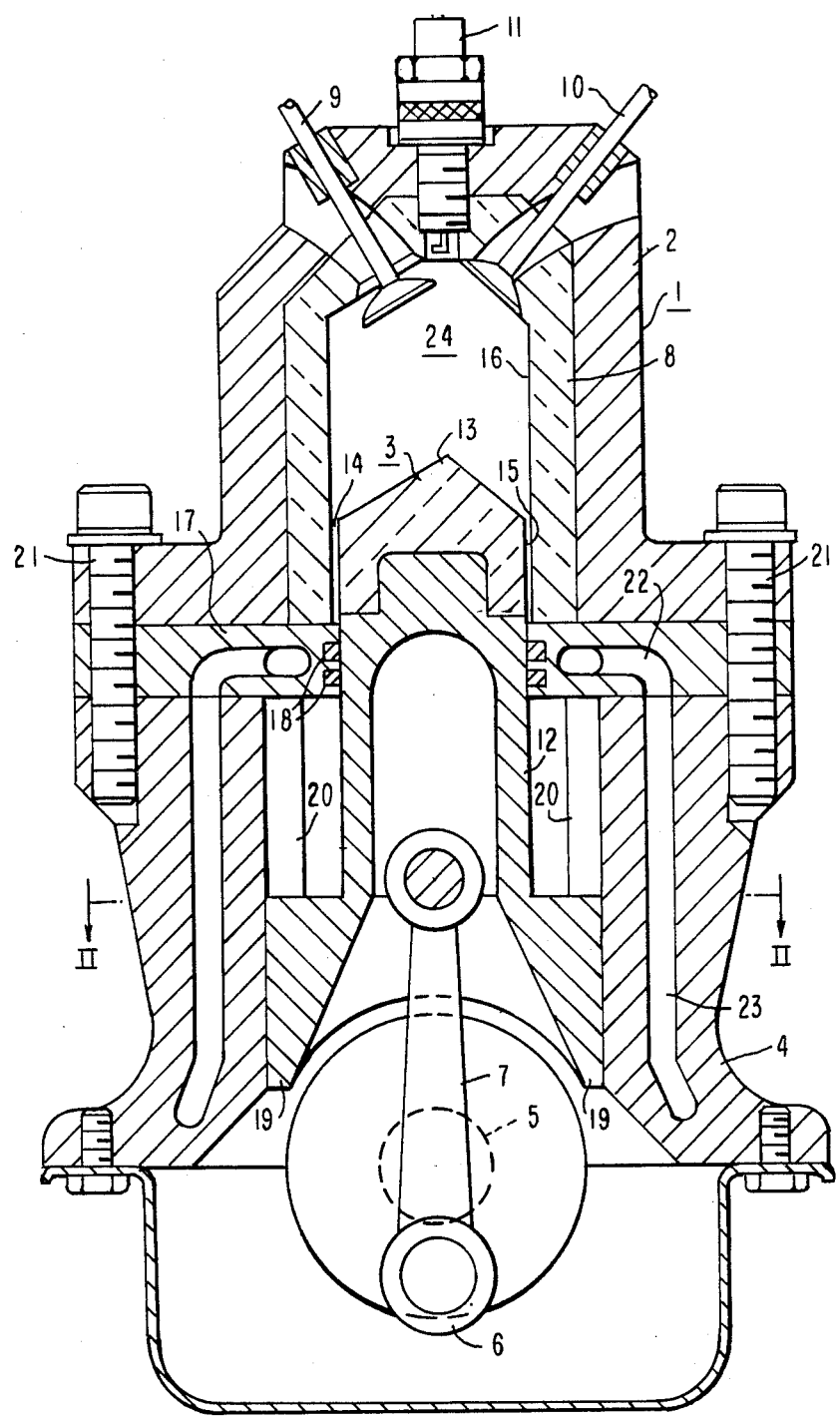
FIG. 1 shows schematically a single cylinder of an engine according to the invention.
Figure 2:
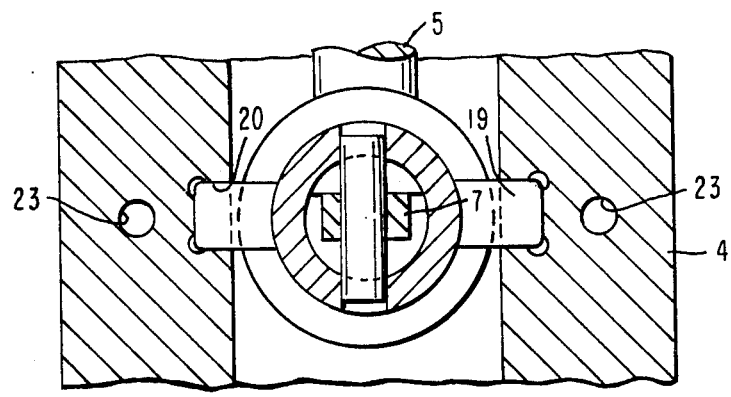
FIG. 2 is a cross-sectional view taken along line II—II of FIG. 1.
Figure 3:
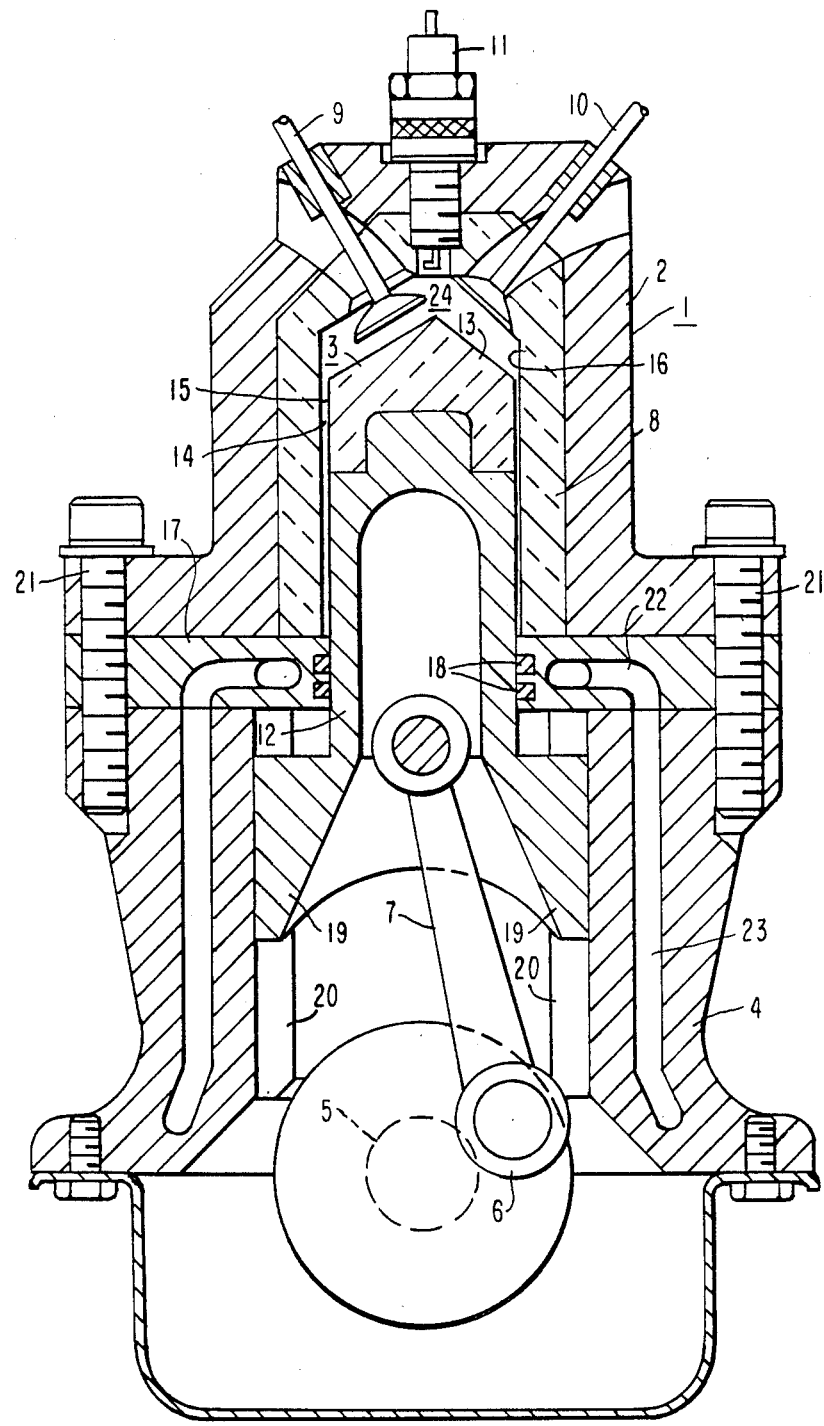
FIG. 3 shows a four-cycle engine as in FIG. 1 at the beginning of the suction stroke when the piston is near the top.

As shown schematically in FIGS. 1, 2 and 3 the engine according to the invention comprises basically a housing 1 defining a cylinder head 2 with a piston 3 movably disposed therein and a lower cylinder block 4 in which a crankshaft 5 is rotatably supported. The crankshaft 5 has a crank 6 linked to the piston 3 by way of a connecting rod 7. The cylinder head 2 has a ceramic inner cylinder 8 and it is provided with an inlet valve 9 and an outlet valve 10 operated by cam shafts mounted on the cylinder or by way of push rods and rocker arms as commonly used in four-cycle engines. The basic engine operating mechanisms need not be shown since those are well known in the art and are not important with regard to the concept of the present invention. The engine may be a Diesel or a gasoline engine and the structure 11 therefore may be a fuel injector or a spark plug.

The piston 3 consists of a piston section 12 having disposed on its top within the cylinder 8 a cap 13 of ceramic or another heat resistant material. The cap 13, which is movable with the piston section 12 into the cylinder 8, is of slightly smaller diameter than the opening of the cylinder 8 so that a small gap 14 remains between the circumferential wall 15 of the cap 13 and the inner cylinder wall 16. The piston section 12 is guided adjacent the cylinder 8 by a piston guide and seal plate 17 which has piston seal rings 18 disposed therein. At its lower end the piston section 12 is provided with guide vanes 19 which are slidably supported in guide grooves 20 formed in the lower cylinder block 4. The cylinder head 2 and the cylinder block 4 are bolted together by bolts 21, the seal plate 17 being engaged therebetween. The seal plate 17 includes cooling passages 22 which preferably surround the seal rings 18 and which are in communication with coolant supply passages 23 formed in the lower cylinder block 4.

The combustion chamber 24 which is surrounded by ceramic cylinder walls 16 and the ceramic piston cap 13 contains the hot combustion gases during the expansion stroke, the ceramic walls being easily capable of withstanding the heat without cooling. The walls of the piston 3 are not in direct contact with the cylinder walls so that wear does not occur along the cylinder walls. Sealing between the piston 12 and the combustion chamber 24 occurs along the stationary seal rings 18, that is, between the wall of the piston section 12 and the seal rings 18 which are mounted in the seal plate 17 and which are sufficiently remote from the combustion chamber so as not to be exposed to the intense heat resulting from the combustion of the fuel therein. It is again noted that the combustion gas temperature is the highest when the piston is still near top dead center, that is, when the hot gases are still far removed from the seals 18. By the time the piston has moved to the bottom dead center the combustion gases have expanded and thereby have been cooled sufficiently to avoid damage to the guide and seal arrangement 17, 18. If necessary a coolant may be circulated through the coolant supply passages 22, 23 to keep the seal rings 18 and the seal and guide plate 17 sufficiently cool. Also, lubricant passages may be provided in the guide plate 17 to supply lubricant to the interface between the piston 12 and the plate 17. No lubrication for the surfaces of cylinder 8 is needed because the piston 12 and the piston cap 13 do not come into contact with the cylinder wall 16.

The vanes 19 are disposed somewhat outward of the piston walls so as to permit them to be extended downwardly toward the crankshaft for good piston slide support. In this manner the piston itself is relatively short and the engine relatively low.

Since no cooling is required in such an adiabatic engine, the space requirements are quite limited and no heat is wasted by cooling so that the engine efficiency is superior to the normal water or air-cooled engines. Engine wear on the other hand is not larger than in normal water or air-cooled engines since the high-temperature piston and cylinder surface structures are not in contact with one another.

LISTING OF REFERENCE NUMERALS

1 Housing
2 Cylinder head
3 Piston
4 Lower cylinder block
5 Crankshaft
6 Crank
7 Connecting rod
8 Ceramic inner cylinder
9 Inlet valve
10 Outlet valve
11 Structure representing spark plug or fuel injector
12 Piston section
13 Piston cap
14 Gap
15 Wall of cap
16 Inner cylinder wall
17 Piston guide and seal plate
18 Piston seal ring
19 Guide vanes
20 Guide grooves
21 Bolts
22 Cooling passage
23 Coolant supply passage
24 Combustion chamber

What is claimed is:

1. An adiabatic internal combustion engine comprising a cylinder having a piston movably disposed therein, means for admitting air and fuel to said cylinder to be combusted therein and means for discharging the combustion gases therefrom, said cylinder including a piston guide and seal structure having stationary seal rings associated therewith and, said cylinder having an inner wall structure of a highly temperature resistant material and said piston having a guided piston section adapted to move back and forth through said guide and seal structure and a cap of highly temperature resistant material, said cap being disposed on top of the guided piston section and extending sufficiently high to provide for the desired compression ratio and said cap further having cylindrical side walls slightly spaced from the cylinder walls.

2. An engine according to claim 1, wherein said highly temperature resistant material is a ceramic material.

3. An engine according to claim 1, wherein the diameter of said cylinder is slightly larger than that of said piston guide and seal structure and co-axial therewith thereby to provide for the spacing between said piston and cylinder walls.

4. An engine according to claim 1, wherein said engine includes a housing, a crankshaft supported in said housing and operatively connected to said piston to control said back and forth movement thereof, said housing also having spaced from said guide plate a piston guide means and said piston having at its end remote from its cap a guide structure arranged in sliding engagement with said piston guide means for appropriately guided support of said piston during said back and forth movement thereof.

5. An engine according to claim 1, wherein said guide and seal structure is a plate having a cylindrical bore provided with annular grooves in which the seal rings are disposed.

6. An engine according to claim 5, wherein said guide and seal plate includes coolant passages extending around said annular grooves.

* * * * *